(12) United States Patent
Kim et al.

(10) Patent No.: US 9,301,181 B2
(45) Date of Patent: Mar. 29, 2016

(54) METHOD AND APPARATUS FOR MEASURING INTERFERENCE IN WIRELESS COMMUNICATION SYSTEM

(71) Applicant: Samsung Electronics Co. Ltd., Suwon-si, Gyeonggi-do (KR)

(72) Inventors: Younsun Kim, Seongnam-si (KR); Hyojin Lee, Seoul (KR); Juho Lee, Suwon-si (KR); Kiil Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 13/848,953

(22) Filed: Mar. 22, 2013

(65) Prior Publication Data

US 2013/0250788 A1 Sep. 26, 2013

Related U.S. Application Data

(60) Provisional application No. 61/614,710, filed on Mar. 23, 2012.

(51) Int. Cl.
*H04W 24/10* (2009.01)
*H04L 5/00* (2006.01)
*H04W 88/08* (2009.01)

(52) U.S. Cl.
CPC .............. *H04W 24/10* (2013.01); *H04L 5/005* (2013.01); *H04L 5/0051* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 2001/0055952 | A1* | 12/2001 | Ficarra | 455/67.3 |
| 2004/0071202 | A1* | 4/2004 | Won et al. | 375/227 |
| 2006/0292988 | A1* | 12/2006 | Yuen et al. | 455/62 |
| 2010/0106828 | A1* | 4/2010 | Palanki et al. | 709/224 |
| 2010/0284286 | A1* | 11/2010 | Bourdeaut | 370/252 |
| 2011/0211560 | A1* | 9/2011 | Yamamoto et al. | 370/332 |
| 2012/0208541 | A1* | 8/2012 | Luo et al. | 455/437 |
| 2013/0003788 | A1* | 1/2013 | Marinier et al. | 375/219 |
| 2013/0077518 | A1 | 3/2013 | Abe et al. | |
| 2013/0094384 | A1* | 4/2013 | Park et al. | 370/252 |

(Continued)

FOREIGN PATENT DOCUMENTS

| | | |
|---|---|---|
| EP | 2 364 045 A1 | 9/2011 |
| EP | 2 557 834 A1 | 2/2013 |

(Continued)

*Primary Examiner* — Hassan Kizou
*Assistant Examiner* — Hashim Bhatti
(74) *Attorney, Agent, or Firm* — Jefferson IP Law, LLP

(57) ABSTRACT

An interference measurement method of a terminal is provided for facilitating downlink transmission in the mobile communication system based on Distributed Antenna System (DAS) in which multiple antennas controlled by a base station are distributed within the service area of the base station. The interference measurement method includes receiving channel measurement information and interference measurement information from a base station, receiving channel state information reference signals, calculating, when the received channel state information reference signal is for channel measurement, a received signal energy based on the channel measurement information and, when the received channel state information reference signal is for interference measurement, an interference based on the interference measurement information, generating channel quality information based on the received signal energy and the interference, and transmitting the channel quality information to the base station.

20 Claims, 11 Drawing Sheets

(56) References Cited

U.S. PATENT DOCUMENTS

2013/0176978 A1  7/2013  Abe et al.
2013/0208604 A1* 8/2013  Lee et al. ...................... 370/252
2014/0177532 A1* 6/2014  Kim et al. ..................... 370/328

FOREIGN PATENT DOCUMENTS

| EP | 2 608 598 A1 | 6/2013 |
| WO | 2011/126025 A1 | 10/2011 |
| WO | 2012/023550 A1 | 2/2012 |

* cited by examiner

METHOD AND APPARATUS FOR MEASURING INTERFERENCE IN WIRELESS COMMUNICATION SYSTEM

CROSS-REFERENCE TO RELATED APPLICATIONS

This application claims the benefit under 35 U.S.C. §119 (e) of a U.S. Provisional application filed on Mar. 23, 2012 in the U.S. Patent and Trademark Office and assigned Ser. No. 61/614,710, the entire disclosure of which is hereby incorporated by reference.

BACKGROUND OF THE INVENTION

1. Field of the Invention

The present invention relates to a mobile communication system. More particularly, the present invention relates to an interference measurement method of a terminal for facilitating downlink transmission in the mobile communication system based on Distributed Antenna System (DAS) in which multiple antennas controlled by a base station are distributed within the service area of the base station.

2. Description of the Related Art

The mobile communication system has evolved into a high-speed, high-quality wireless packet data communication system to provide data and multimedia services beyond the early voice-oriented services. Recently, various mobile communication standards, such as High Speed Downlink Packet Access (HSDPA), High Speed Uplink Packet Access (HSUPA), Long Term Evolution (LTE), and LTE-Advanced (LTE-A) defined in 3rd Generation Partnership Project (3GPP), High Rate Packet Data (HRPD) defined in 3rd Generation Partnership Project-2 (3GPP2), and 802.16 defined in IEEE, have been developed to support high-speed, high-quality wireless packet data communication services. LTE is a communication standard developed to support high speed packet data transmission and to maximize the throughput of the radio communication system with various radio access technologies. LTE-A is the evolved version of LTE to improve the data transmission capability.

LTE is characterized by 3GPP Release 8 or 9 capable base stations and terminals (user equipment) while LTE-A is characterized by 3GPP Release 10 capable base stations and user equipment. As a key standardization organization, 3GPP continues standardization of the next release for more improved performance beyond LTE-A.

A recent issue under discussion is a technique for the terminal to measure and report interference to the base station in order to improve communication efficiency. However, the legacy terminal is configured to measure the interference caused by the transmission points of other cells but not those in the same cell, which may lead to acquiring an incorrect Signal-to-Interference ratio. Such incorrectness in Signal-to-Interference ratio is likely to cause significant problems in the LTE/LTE-A system adopting Adaptive Modulation and Coding (AMC) for adjusting the downlink data rate adaptively based on the Signal-to-Interference ratio.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problem and/or disadvantages and to provide at least the advantages described below. Accordingly, an aspect of the present invention is to provide a method and apparatus for measuring downlink interference efficiently in the DAS-based LTE-A system.

In accordance with an aspect of the present invention, an interference measurement method of a terminal in a wireless communication system is provided. The method includes receiving channel measurement information and interference measurement information from a base station, receiving channel state information reference signals, calculating, when the received channel state information reference signal is for channel measurement, a received signal energy based on the channel measurement information, calculating, when the received channel state information reference signal is for interference measurement, an interference based on the interference measurement information, generating channel quality information based on the received signal energy and the interference, and transmitting the channel quality information to the base station.

In accordance with another aspect of the present invention, a terminal for measuring interference in a wireless communication system is provided. The terminal includes a transceiver for communicating with a base station, and a controller for controlling reception of channel measurement information and interference measurement information from a base station, for receiving channel state information reference signals, for calculating, when the received channel state information reference signal is for channel measurement, a received signal energy based on the channel measurement information, for calculating, when the received channel state information reference signal is for interference measurement, an interference based on the interference measurement information, for generating a channel quality information based on the received signal energy and the interference, and for transmitting the channel quality information to the base station.

In accordance with another aspect of the present invention, a method for a base station to control interference measurement of a terminal in a wireless communication system is provided. The method includes transmitting channel measurement information and interference measurement information to the terminal, transmitting channel state information reference signals to the terminal, and receiving channel quality information from the terminal, wherein the channel quality information is generated based on received signal energy calculated based on the channel measurement information, and wherein the interference information is calculated based on the interference measurement information.

In accordance with still another aspect of the present invention, a base station for controlling interference measurement of a terminal in a wireless communication system is provided. The base station includes a transceiver for communicating with the terminal, and a controller for controlling transmission of channel measurement information and interference measurement information to the terminal, for transmitting channel state information reference signals to the terminal, and for receiving channel quality information from the terminal, wherein the channel quality information is generated based on received signal energy calculated based on the channel measurement information and wherein the interference information is calculated based on the interference measurement information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
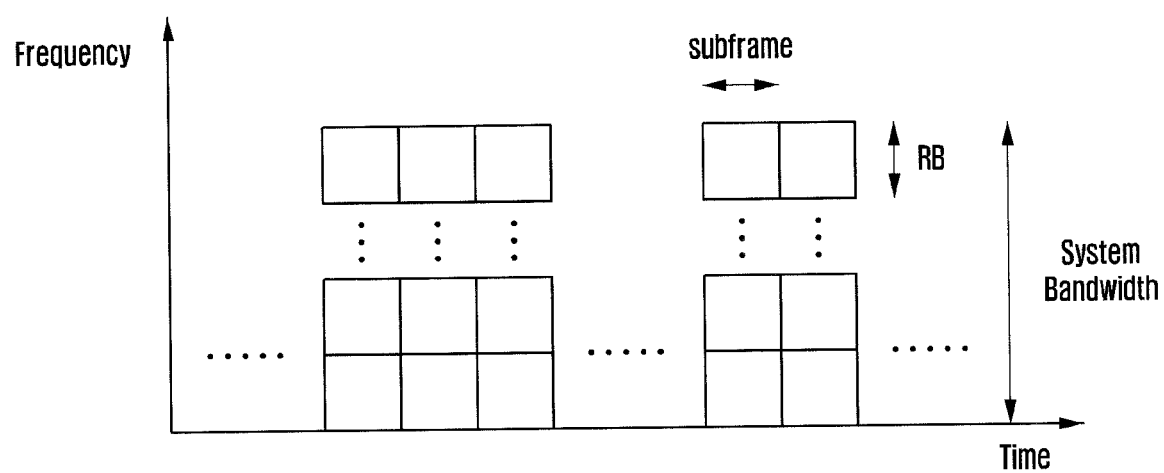
FIG. 1 is a diagram illustrating a time-frequency resource grid for an LTE/LTE-A system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention are described with reference to the accompanying drawings in detail. Detailed description of well-known functions and structures incorporated herein may be omitted to avoid obscuring the subject matter of the present invention. Furthermore, terms used herein are defined by taking functions according to exemplary embodiments of the present invention into account and can be changed according to the practice or intention of users or operators. Therefore, definition of the terms should be made according to overall disclosures set forth herein.

Although exemplary embodiments of the present invention described herein are directed to the OFDM-based radio communication system, particularly 3GPP E-UTRA standard, it will be understood by those skilled in the art that exemplary embodiments of the present invention can be applied to other mobile communication systems having a similar technical background and channel format, with a slight modification, without departing from the spirit and scope of the present invention.

The existing 3rd and 4th generation wireless packet data communication systems (such as High Speed Downlink Packet Access (HSDPA), High Speed Uplink Packet Access (HSUPA), High Rate Packet Data (HRPD), and Long Term Evolution (LTE)/LTE-Advanced) adopt Adaptive Modulation and Coding (AMC) and Channel-Sensitive Scheduling techniques to improve the transmission efficiency. AMC allows the transmitter to adjust the data amount to be transmitted according to the channel condition. The transmitter is capable of decreasing the data transmission amount for bad channel conditions so as to fix the received signal error probability at a certain level or increasing the data transmission amount for good channel condition so as to transmit large amount of information efficiently while maintaining the received signal error probability at an intended level. The channel sensitive scheduling allows the transmitter to serve users having good channel conditions selectively among a plurality of users so as to increase the system capacity as compared to allocating a fixed channel to serve a single user. This increase in system capacity is referred to as multi-user diversity gain. The AMC method and the channel-sensitive scheduling method are methods for receiving partial channel state information being fed back from a receiver, and applying an appropriate modulation and coding technique at the most efficient time determined depending on the received partial channel state information.

In case of using AMC along with Multiple Input Multiple Output (MIMO) transmission scheme, it may be necessary to take a number of spatial layers and ranks for transmitting signals into consideration. In this case, the transmitter determines the optimal data rate in consideration of the number of layers for use in MIMO transmission.

Recently, research is being conducted to replace Code Division Multiple Access (CDMA) used in the legacy 2nd and 3rd mobile communication systems with Orthogonal Frequency Division Multiple Access (OFDMA) for the next generation mobile communication system. The 3GPP and 3GPP2 are in the middle of the standardization of OFDMA-based evolved system. OFDMA is expected to provide superior system throughput as compared to the CDMA. One of the main factors that allow OFDMA to increase system throughput is the frequency domain scheduling capability. As channel sensitive scheduling increases the system capacity using the time-varying channel characteristic, OFDM can be used to obtain more capacity gain using the frequency-varying channel characteristic.

FIG. 1 is a diagram illustrating a time-frequency resource grid for an LTE/LTE-A system according to an exemplary embodiment of the present invention.

Referring to FIG. 1, the radio resource for transmission from the base station (e.g., evolved Node B (eNB)) to terminal (e.g., User Equipment (UE)) is divided into Resource Blocks (RBs) in the frequency domain and subframes in the time domain. In the LTE/LTE-A system, an RB generally consists of 12 consecutive carriers and occupies 180 kHz bandwidth. A subframe generally consists of 14 OFDM symbols and has 1 msec duration in general. The LTE/LTE-A system can allocate resources for scheduling in unit subframe in the time domain and in unit of RB in the frequency domain.

Figure 2:
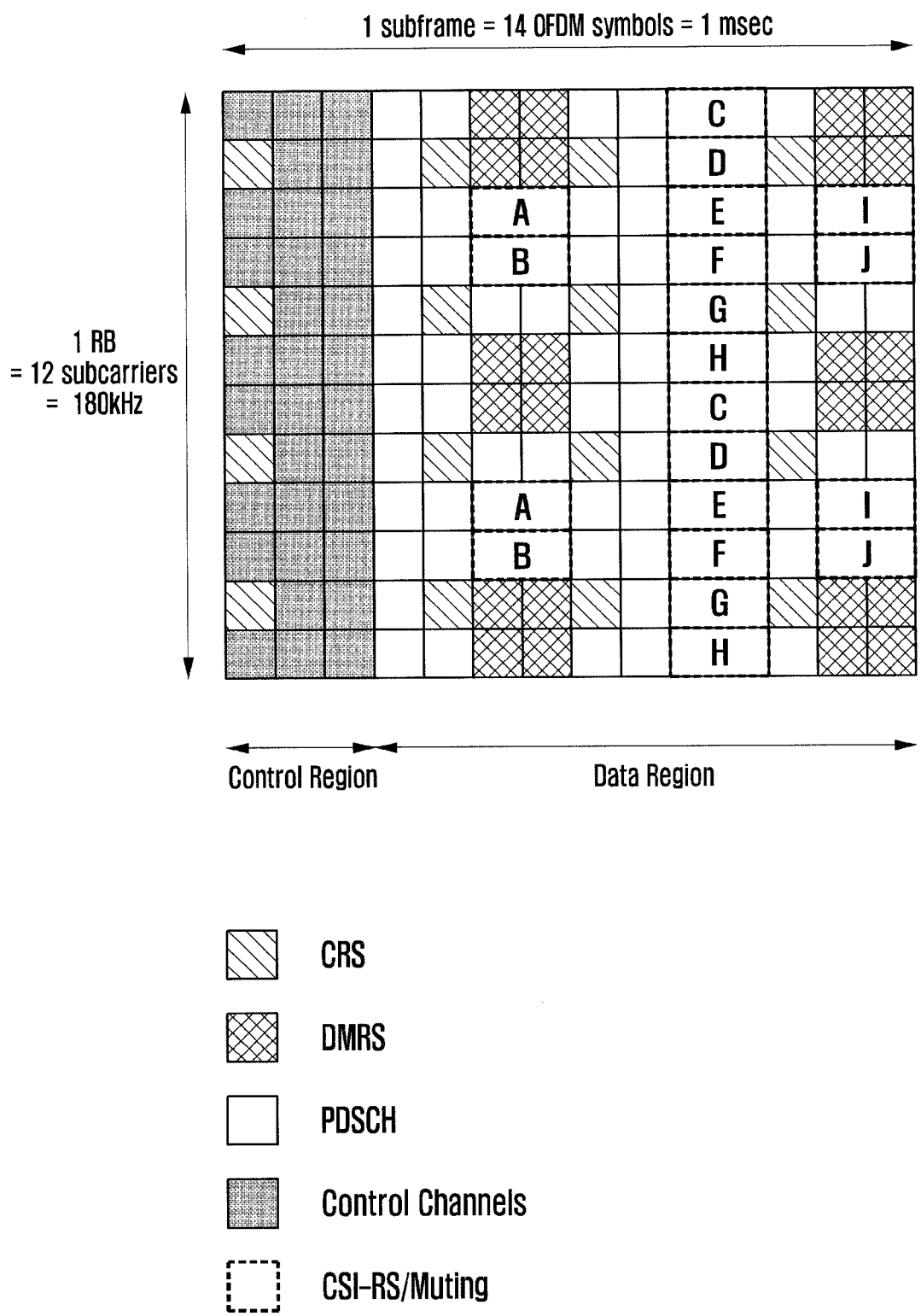
FIG. 2 is a diagram illustrating a structure of a Resource Block (RB) of a subframe as a minimum unit of resource allocation for downlink scheduling in an LTE/LTE-A system according to an exemplary embodiment of the present invention.

FIG. 2 is a diagram illustrating the structure of an RB of a subframe as a minimum unit of resource allocation for downlink scheduling in an LTE/LTE-A system according to an exemplary embodiment of the present invention.

Referring to FIG. 2, the radio resource is of one subframe in the time domain and one RB in the frequency domain. The radio resource consists of 12 subcarriers in the frequency domain and 14 OFDM symbols in the time domain, i.e. 168 unique frequency-time positions. In LTE/LTE-A, each frequency-time position is referred to as Resource Element (RE).

The radio resource depicted in FIG. 2 can be used for transmitting several different types of signals as follows:

Cell-specific Reference Signal (CRS): reference signal transmitted to all the UEs within a cell Demodulation Reference Signal (DMRS): reference signal transmitted to a specific UE Physical Downlink Shared Channel (PDSCH): data channel transmitted in downlink which the eNB use to transmit data to the UE and mapped to REs not used for reference signal transmission in data region of FIG. 2

Channel Status Information Reference Signal (CSI-RS): reference signal transmitted to the UEs within a cell and used for channel state measurement. Multiple CSI-RSs can be transmitted within a cell.

Other control channels (PHICH, PCFICH, Physical Downlink Control Channel (PDCCH)): channels for providing control channel necessary for the UE to receive PDCCH and transmitting ACK/NACK of Hybrid Automatic Repeat Request (HARQ) operation for uplink data transmission In addition to the above signals, zero power CSI-RS can be configured in order for the UEs within the corresponding cells to receive the CSI-RSs transmitted by different eNBs in the LTE-A system. The zero power CSI-RS (muting) can be mapped to the positions designated for CSI-RS. The UE generally receives the traffic signal skipping the corresponding radio resource. In the LTE-A system, the zero power CSI-RS is referred to as muting. The zero power CSI-RS (muting) by nature is mapped to the CSI-RS position without transmission power allocation.

In FIG. 2, the CSI-RS can be transmitted at some of the positions marked by A, B, C, D, E, F, G, H, I, and J according to the number of number of antennas transmitting CSI-RS. The zero power CSI-RS (muting) can also be mapped to some of the positions A, B, C, D, E, F, G, H, I, and J. The CSI-RS can be mapped to 2, 4, or 8 REs according to the number of the antenna ports for transmission. For two antenna ports, half of a specific pattern is used for CSI-RS transmission; for four antenna ports, the entire specific pattern is used for CSI-RS transmission; and for eight antenna ports, two patterns are used for CSI-RS transmission. Although the zero power CSI-RS (muting) can be applied to multiple patterns, zero-power CSI-RS cannot be applied to a part of one pattern if the positions are not overlapped with CSI-RS position.

In a cellular system, a reference signal should be transmitted for downlink channel state measurement. In the case of the 3GPP LTE-A system, the UE measures the channel state with the eNB using the CSI-RS transmitted by the eNB. The channel state is measured in consideration of a few factors including downlink interference. The downlink interference includes the interference caused by the antennas of neighbor eNBs and thermal noise that are important in determining the downlink channel condition. For example, in the case that the eNB with one transmit antenna transmits the reference signal to the UE with one receive antenna, the UE has to determine energy per symbol that can be received in downlink and interference amount that may be received for the duration of receiving the corresponding symbol to calculate Es/Io from the received reference signal. The calculated Es/Io is reported to the eNB such that the eNB determines the downlink data rate for the UE.

In a general mobile communication system, the base station apparatus is positioned at the center of each cell and communicates with the UE using one or plural antennas deployed at a restricted position. Such a mobile communication system implemented with the antennas deployed at the same position within the cell is referred to as a Centralized Antenna System (CAS). In contrast, the mobile communication system implemented with plural Remote Radio Heads (RRHs) belonging to a cell are distributed within the cell area is referred to as Distributed Antenna System (DAS).

Figure 3:
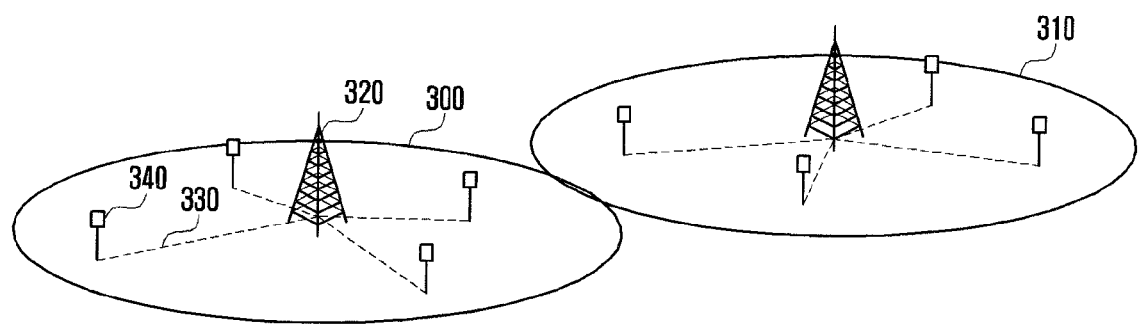
FIG. 3 is a diagram illustrating antenna arrangement in a distributed antenna system according to the related art.

FIG. 3 is a diagram illustrating the antenna arrangement in a distributed antenna system according to the related art.

FIG. 3 shows the distributed antenna system included two cells 300 and 310. The cell 300 is provided with one high power antenna 320 and four low power antennas. The high power antenna is capable of serving the UEs at least within entire cell area while the low power antennas are capable of serving the UEs at restricted regions within the cell at high data rate. The low and high power antennas are connected to the central controller as denoted by reference number 330 and operate according to the scheduling and radio resource allocation of the central controller. In the distributed antenna system, one or more antennas can be deployed at one geometrically separated antenna position. In the present invention, the DAS antenna(s) arranged at the same position is referred to as transmission point or Remote Radio Head (RRH).

In the distributed antenna system as depicted in FIG. 3, the UE receives signals from one geometrically distributed transmission point and regards the signals from others as interference.

Figure 4:
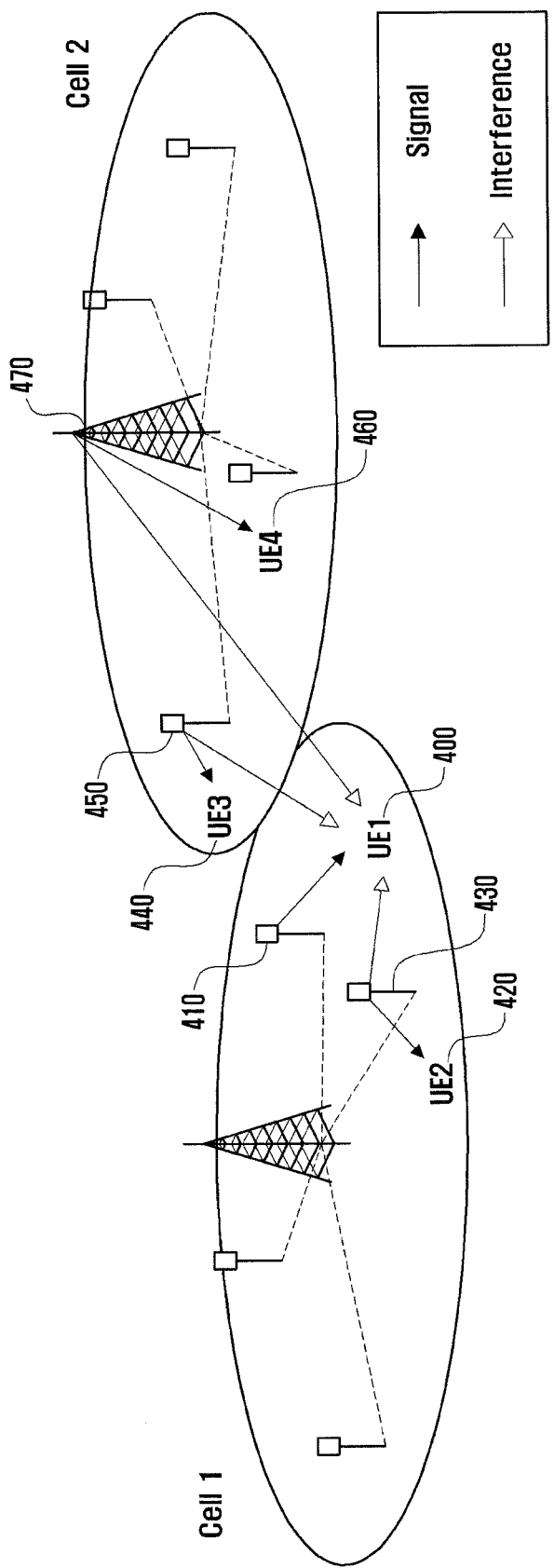
FIG. 4 is a diagram illustrating an exemplary interference situation when transmission points transmit signals to different User Equipment (UEs) in a distributed antenna system according to an exemplary embodiment of the present invention.

FIG. 4 is a diagram illustrating an exemplary interference situation when transmission points transmit signals to different UEs in a distributed antenna system according to an exemplary embodiment of the present invention.

Referring to FIG. 4, the UE 1 400 is receiving traffic signals from the transmission point 410. The UE 2 420, UE 3 440, and UE 4 460 are receiving signals from the transmission points 430, 450, and 470, respectively. In this case, the UE 1 is interfered by the signals transmitted from the transmission points to the other UEs while the UE 1 400 is receiving the traffic signal from the transmission point 410. The signals transmitted from the transmission points 430, 450, and 470 cause interferences to the UE 1 400.

Typically, in the distributed antenna system, the interferences caused by other transmission points are classified into two categories:

Inter-cell interference: interference caused by transmission points of other cells Intra-cell interference: interference caused by transmission points of same cell In FIG. 4, the UE 1 400 undergoes intra-cell interference from the transmission point 430 of the same cell and inter-cell interference from the transmission points 450 and 470 of a neighbor cell. The inter-cell interference and the intra-call interference influence the data channel reception of the UE simultaneously.

In order for the DAS-capable UE to receive downlink signal at optimal data rate, the inter-cell interference and intra-cell interference should be measured accurately and compared with the received signal strength to request the eNB for the data rate based on the comparison result.

Unlike DAS, Centralized Antenna System (CAS) has only one transmission point. In this case, there is on intra-cell interference caused by other transmission points within the same cell but inter-cell interference caused by the transmission points of neighbor cells. In the case that the LTE/LTE-A system is implemented based on CAS, it is possible to measure the inter-cell interference using the CRS described with reference to FIG. 2. Typically, in the DAS-based system, the UE performs Inverse Fast Fourier Transform (IFFT) on the CRS having periodic characteristic in frequency domain to generate delay domain signal.

Figure 5:
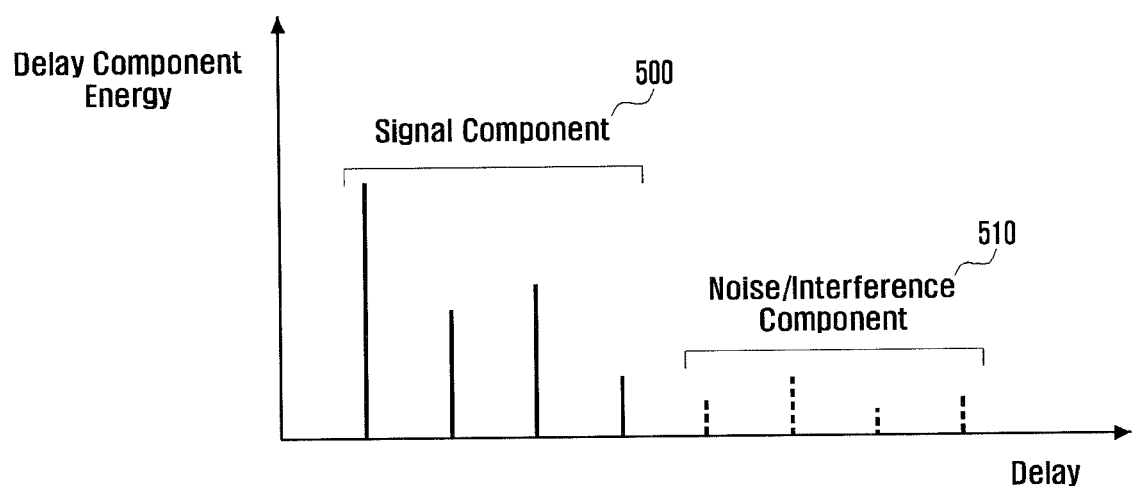
FIG. 5 is a graph illustrating delay domain signals converted from Cell-specific Reference Signal (CRS) according to an exemplary embodiment of the present invention.

FIG. 5 is a graph illustrating delay domain signals converted from CRS according to an exemplary embodiment of the present invention.

Referring to FIG. 5, in the LTE/LTE-A system, if the signal is converted to delay domain single through IFFT, it is possible to acquire the channel impulse response having a tendency in which the energy carried by the delay component decreases as the delay increases as shown in FIG. 5. Typically, the tail part 510 of the signal acquired through IFFT corresponds to the interference caused by other cell while the head part 500 of the signal corresponds to the actual signal component of CRS. In this case, the UE is capable of calculating Signal to Noise ratio by measuring the size of the interference at the tail part. Such an interference measurement is possible because different cells do not transmit the same CRS. Since the different cells transmit CRSs using different frequency-time resources and the cells apply unique scrambling codes, the above interference measurement is possible. In the case of LTE/LTE-A, the scrambling of the CRS is determined by Cell ID of the corresponding cell.

In the DAS-based LTE/LTE-A system, however, all transmission points of the same cell transmit the CRS at the same timing and cannot apply unique scrambling CRSs. If the different transmission points of the same cell cannot transmit unique CRSs, although the inter-cell interference amount from the transmission points of the neighbor eNBs can be measured, it is impossible to measure the intra-cell interference from other transmission points of the same cell.

In the case of measuring the interference amount using the method described with reference to FIG. 5, the UE is capable of calculating the interference caused by the transmission points of other cells but not the interference caused by the other transmission points of the same cell, resulting in inaccurate Signal-to-Interference ratio. The inaccurate Signal-to-Interference ratio causes significant performance degradation of the LTE/LTE-A system which determines downlink data rate using AMC based on the Signal-to-Interference ratio.

Exemplary embodiments of the present invention propose an efficient interference measurement method and apparatus to address these issues.

As described above, in order to determine the downlink data rate efficiently in the DAS-based communication system, the UE should be able to measure the intra-cell interference as well as the inter-cell interference. In order to achieve this, exemplary embodiments of the present invention propose a method for measuring interference based on CSI-RS.

Interference Measurement Method Based on CSI-RS

In the case of measuring interference based on CSI-RS, the UE receives the CSI-RS transmitted by the RRHs incurring interference to measure the interference and acquires other interference and noises based on the zero power CSI-RS or Interference Measurement Resource (IMR). In this method, the eNB notifies the UE of an interference measurement set for measurement of the interferences caused by the interfering RRHs. The interference measurement set is the set of transmission points incurring interference to the UE within the cell where the UE is located. In the exemplary case of FIG. 4, the UE measures inter-cell interference using the CRS transmitted by cell 2 and intra-cell interference using the CSI-RS transmitted by cell 1. In order to achieve this, the eNB notifies the UE of an interference measurement set including the transmission points incurring intra-cell interference and information necessary for receiving the CSI-RS transmitted by the transmission points included the interference measurement set.

The interference measurement set and the information necessary for receiving the CSI-RS transmitted by the transmission points included the interference measurement set is transmitted to the UE through higher layer signaling. The higher layer signaling can be performed per UE or per group of UEs. Table 1 shows an exemplary case for an eNB notifying the UE of the above-described information in order for the UE to measure the intra-cell interference efficiently.

TABLE 1

Interference measurement-related information transmitted from eNB to UE

| Signal Measurement | Interference Measurement Set | Info. necessary for receiving Transmission Points included in Interference Measurement Set |
|---|---|---|
| RRH1 | RRH2, RRH3, RRH4 | CSI-RS information transmitted by RRH2, RRH3, and RRH4: Tx period, Tx location, number of Tx antennas, etc. |
|  | RRH3, RRH4 | CSI-RS information transmitted by RRH3 and RRH4: Tx period, Tx location, number of Tx antennas, etc. |
| RRH2 | RRH1, RRH3, RRH4 | CSI-RS information transmitted by RRH2, RRH3, and RRH4: Tx period, Tx location, number of Tx antennas, etc. |
|  | RRH3, RRH4 | CSI-RS information transmitted by RRH3 and RRH4: Tx period, Tx location, number of Tx antennas, etc. |

In Table 1, the eNB is capable of assigning plural Rx transmission points to the UE and then notifying the interference measurement set per Rx transmission point and CSI-RS information. The Rx transmission point denotes the transmission point as a target for downlink channel status measurement of the UE. In Table 1, the first among the four cases has the Rx transmission point of RRH 1 and interfering transmission points of RRH2, RRH3, and RRH4. In this case, the UE measures the CSI-RS transmitted by the RRH1 to acquire the channel information and measures the CSI-RSs transmitted by the RRH2, RRH3, and RRH4 to acquire interference information, resulting in acquisition of accurate channel statue.

In order to perform interference measurement as described above, the eNB configures the following information to the UE:

CSI-RS for channel measurement;

At least one CSI-RS for interference measurement;

IMR for other interference and noise measurement not included in the above interference measurement; and The CSI-RS for channel measurement is of measuring signal channel and the CSI-RS for interference measurement is of being transmitted by RRHs included in the interference measurement set in Table 1.

In order to measure the interference caused by the RRH based on the CSI-RS transmitted by the corresponding RRH, it is necessary to know the ratio of the CSI-RS transmit power to the PDSCH transmit power of the corresponding RRH.

Figure 6:
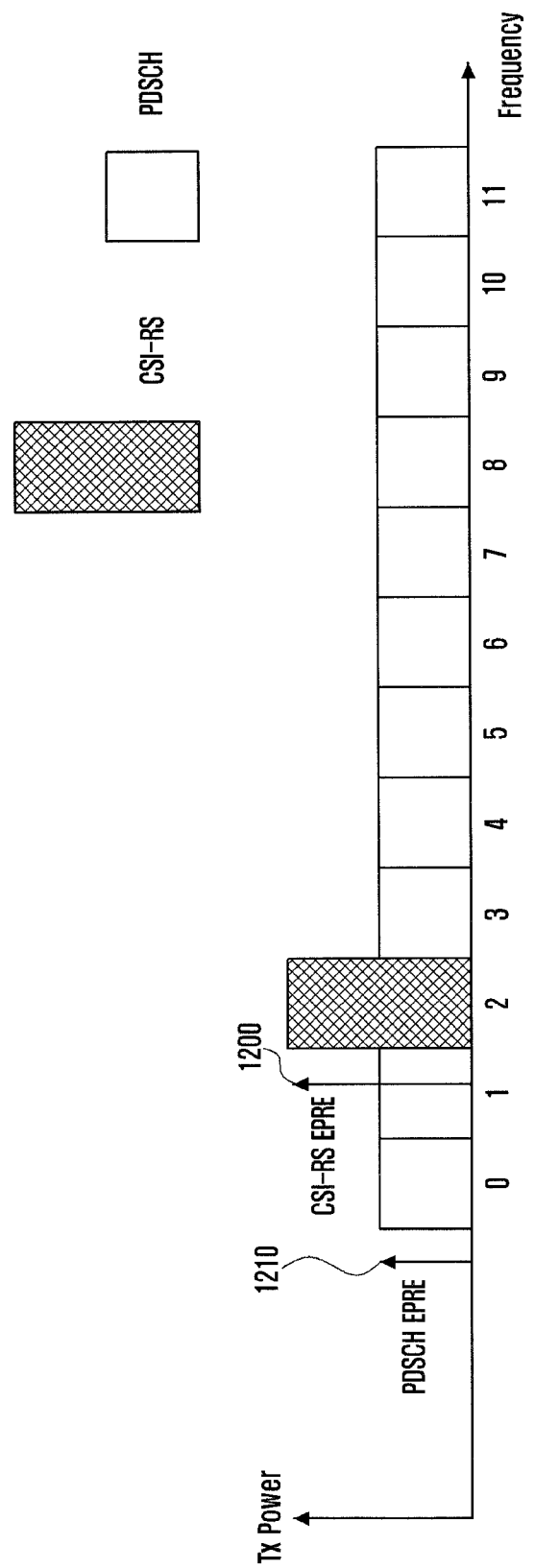
FIG. 6 is a graph illustrating the comparison between Channel Status Information Reference Signal (CSI-RS) and Physical Downlink Control Channel (PDCCH) transmit powers of an interfering Remote Radio Head (RRH) in a system according to an exemplary embodiment of the present invention.

FIG. 6 is a graph illustrating a comparison between CSI-RS and PDCCH transmit powers of an interfering RRH in a system according to an exemplary embodiment of the present invention.

Referring to FIG. 6, the CSI-RS and PDSCH transmitted by the interfering RRH have different transmit powers. The CSI-RS is transmitted at the transmit power of 1200 while the PDSCH is transmitted at the transmit power of 1210. In order to measure the interference caused by the interfering RRH accurately, it is necessary to know the transmit power ratio between CSI-RS and PDSCH. According to exemplary embodiments the present invention, this value is defined as interference measurement information Pd, and it is assumed that the eNB notifies the UE of Pd. The proposed Pd is the ratio between CSI-RS transmit power and interference and can be defined in Equation (1):

$$Pd = \frac{\text{Interference EPRE}}{\text{CSI-RS EPRE}} \ (UE \text{ assumption}) \quad \text{Equation (1)}$$

The Pd can be configured per CSI-RS received for interference measurement or one Pd value notified to the UE can be used commonly applied to all CSI-RSs received for interference measurement. In an exemplary case that the eNB configures CSI-RS1 and CSI-RS2 in order for the UE to measure the interference caused by adjacent RRHs, the eNB may notify the UE of Pd1 and Pd2 for respective CSI-RS1 and CSI-RS2 or a common Pd for both the CSI-RS1 and CSI-RS2 calculated using Equation (1). The UE calculates the reception energy of the CSI-RS as the interference measurement target and multiplies calculation result to the Pd to acquire the strength of the interference signal.

In the LTE system, a value for use in measurement of the reception energy is defined as channel measurement information Pc, which is the ratio between the transmit power of CSI-RS of the RRH to transmit PDSCH and the transmit power of PDSCH. Pc is defined in Equation (2):

$$Pc = \frac{\text{PDSCH EPRE}}{\text{CSI-RS EPRE}} \ (UE \text{ assumption}) \quad \text{Equation (2)}$$

Figure 7:
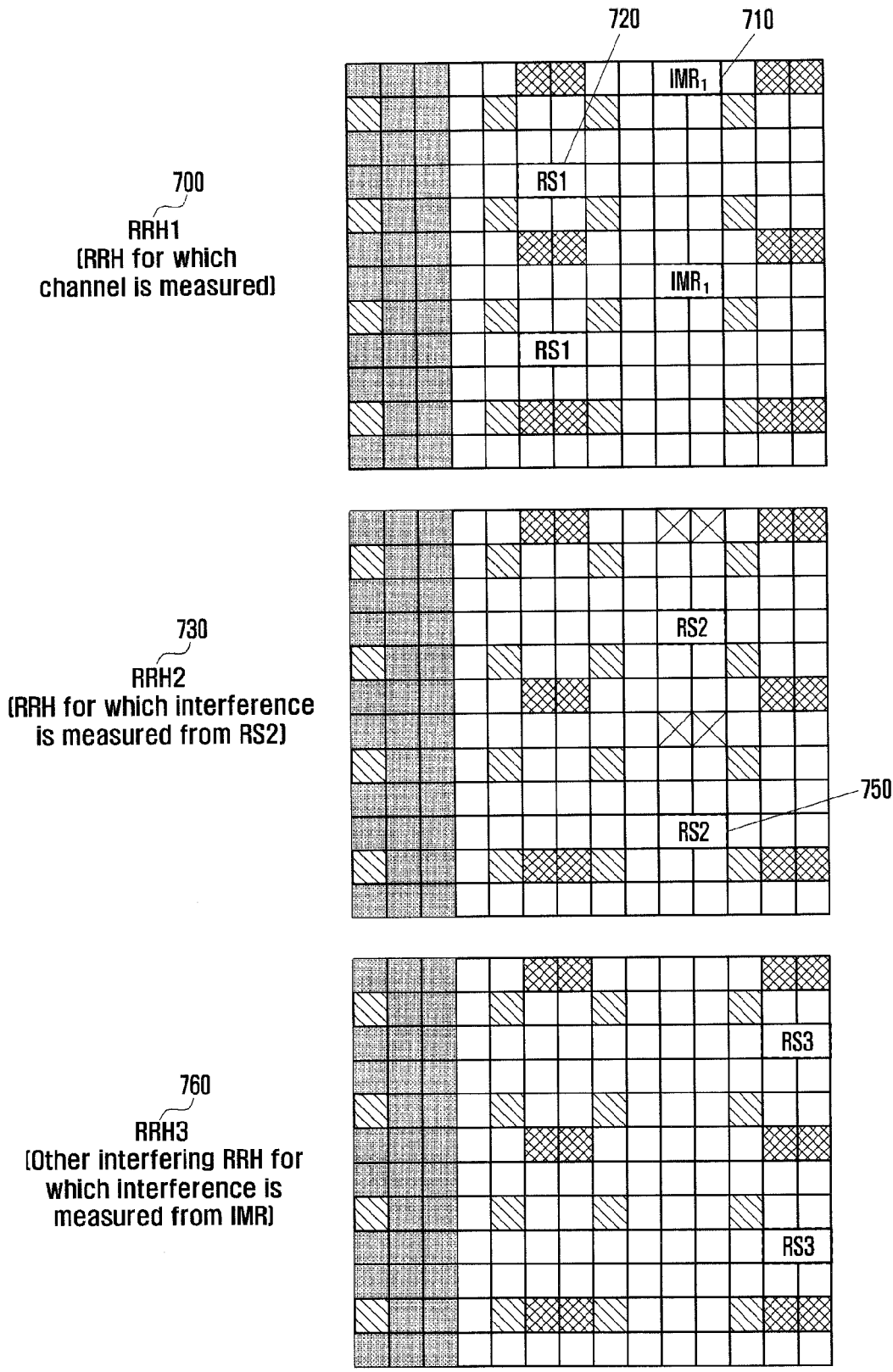
FIG. 7 is a diagram illustrating exemplary resource structures of respective RRHs in a Distributed Antenna System (DAS) according to an exemplary embodiment of the present invention.

The UE measures the reception energy of the CSI-RS transmitted by the RRH transmitting PDSCH to the UE and calculates the reception energy of PDSCH by multiplying Pc value to the CSI-RS reception energy. FIG. 7 shows transmit power difference between the CSI-RS and PDCCH. The UE applies one of Pd and Pc depending on whether the received CSI-RS is for channel measurement or interference measurement. Equation (3) expresses Signal energy-to-interference-plus-noise ratio with application of Pc and Pd:

$$\frac{Es}{Io+No} = \frac{Pc \cdot E_C}{\sum_i Pd(i)E_d(i)+No} \ (UE \text{ assumption}) \quad \text{Equation (3)}$$

In Equation (3), Es denotes PDSCH reception energy, and Ec is the CSI-RS reception energy measured based on the CSI-RS transmitted by the RRH transmitting PDSCH. Ed(i) denotes the reception energy based on the CSI-RS transmitted by ith RRH incurring interference, and No denotes other interferences and noise. Pd(i) is the ratio between the ith CSI-RS transmit power and interference, and Pc denotes the ratio between CSI-RS transmit power of the RRH transmitting PDSCH and the PDSCH transmit power. Io denotes the interference measured by the UE based on the CSI-RS.

In Equation (3), No denotes the size of other interference, with the exception of the interference measured based on the CSI-RS transmitted by the interfering RRHs, and noise. The UE measures No using IMR. IMR is a set of REs defined for interference measurement and one of the radio resources marked by A, B, C, D, E, F, G, H, I, and J of FIG. 2. The eNB designates one of the radio resources corresponding to A, B, C, D, E, F, G, H, I, and J as IMR for measuring other interference, with the exception of the interference measured based on the CSI-RS transmitted by the interfering RRHs, and noise. With the IMR configuration, the UE regards all signals received at REs corresponding to IMR as interference and noise and thus substitutes this for No of Equation (3) to acquire the signal energy-to-interference-plus-noise ratio.

FIG. 7 is a diagram illustrating exemplary resource structures of respective RRHs in the DAS-based system according to an exemplary embodiment of the present invention.

Referring to FIG. 7, a UE estimates the channel status of RRH1 700. For this purpose, the UE measures the CSI-RS reception energy based on the CSI-RS1 720 transmitted by the RRH1 700. The PDSCH reception energy is calculated by applying the Pc of Equation (2) to this value. The eNB also instructs the UE to perform interference measurement based on the CSI-RS2 750 transmitted by RRH2 730 which causes interference to the signal transmitted by RRH1 700. In the procedure, the eNB notifies the UE of Pd along with information such as CSI-RS period and number of CSI-RS ports. The UE applies the Pd value to the CSI-RS2 reception energy to calculate the size of the interference generated by the RRH2. The eNB configures the Interference Measurement Resource (IMR) 710 for the UE. The UE regards the signal received on the corresponding radio resource as other interference or noise with the exception of the interference measured based on the CSI-RS2. The UE calculates No part of Equation (3) using the size of the radio signal received on IMR 710. With IMR, the UE is capable of measuring the interference caused by RRH3 760 and the noise occurring at its reception apparatus. Since the interference caused by RRH2 730 is calculated based on the direct CSI-RS2, it should be ruled out in measuring the interference based on the IMR 710. For this purpose, the RRH2 730 does not transmit signal at the radio resource occupied by IMR1. Accordingly, the UE measures the interference caused by RRH3 760 and noise generated by its reception apparatus on the resource for IMR1.

Figure 8:
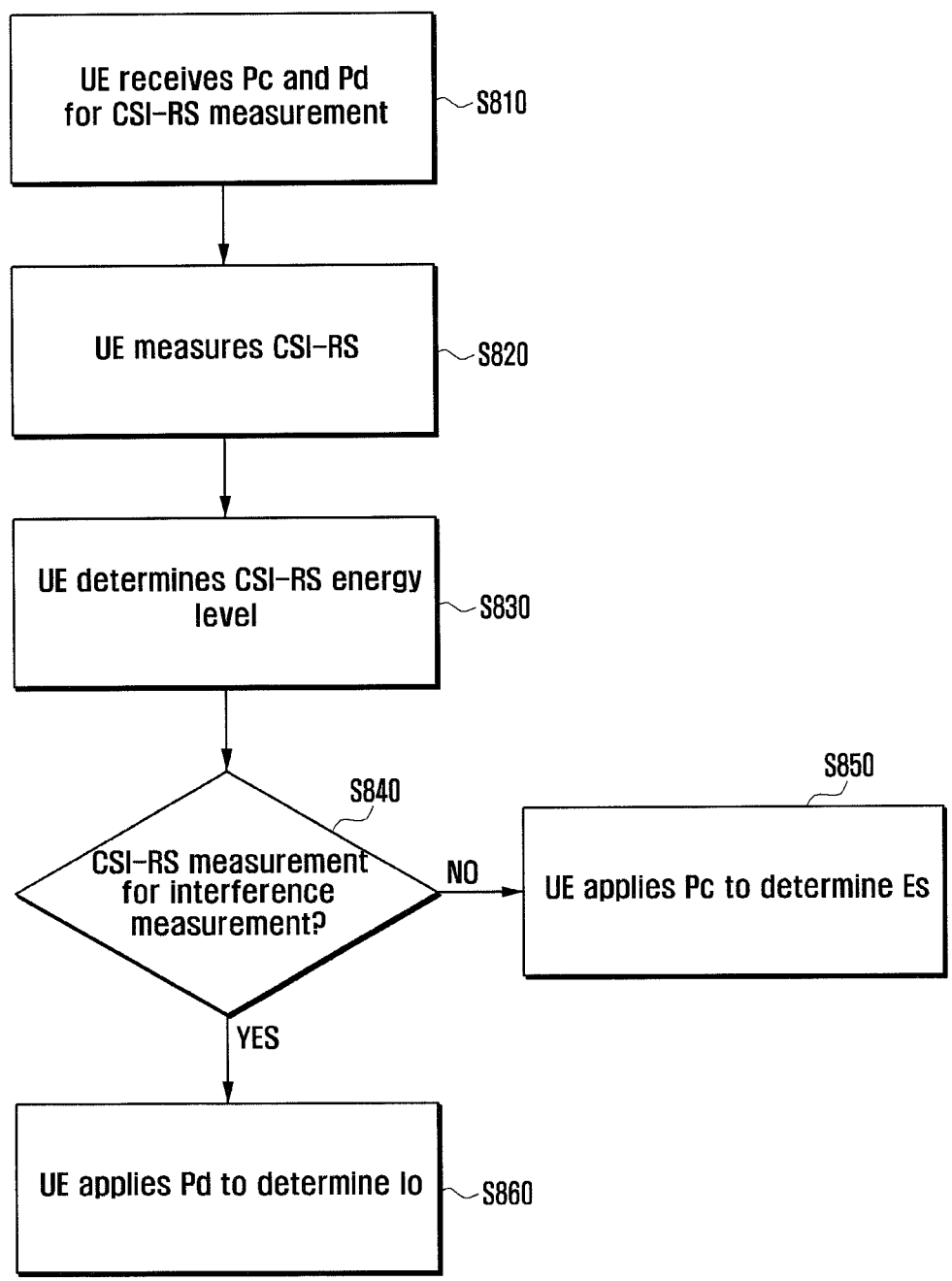
FIG. 8 is a flowchart illustrating a UE procedure of an interference measurement method according to an exemplary embodiment of the present invention.

FIG. 8 is a flowchart illustrating a UE procedure of an interference measurement method according to an exemplary embodiment of the present invention.

Referring to FIG. 8, the UE receives Pc and Pd values transmitted by the eNB at step S810. The UE also receives the CSI-RS for channel status measurement and CSI-RS for interference measurement from the eNB. If multiple CSI-RSs for interference measurement are transmitted, the Pd value can be defined per CSI-RS or as a common Pd for all CSI-RSs for interference measurement. After receiving the configuration information on Pc and Pd from the eNB at step S810, the UE measures CSI-RS at step S820. Using the value measured at step S820, the UE calculates the reception energy of the corresponding CSI-RS at step S830. The UE determines whether the CSI-RS is the CSI-RS for interference measurement at step S840. If the corresponding CSI-RS is not the interference measurement CSI-RS (but is rather the channel measurement CSI-RS), the UE applies Pc to calculate the signal energy Es at step S850.

Otherwise, if the corresponding CSI-RS is the interference measurement CSI-RS, the UE applies Pd to calculate the interference caused by the RRH at step S860. Afterward, the UE calculates the signal energy-to-interference-plus-noise ratio by plugging the acquired Es and interference amount in Equation (3).

According to an exemplary embodiment of the present invention, the No may be applied in calculating the signal energy-to-interference-plus-noise. No denotes the interference and noise with the exception of the interference measured based on the CSI-RS for interference measurement and can be calculated using the muting.

The UE is capable of generating the channel quality indicator to the eNB using the information on the calculated signal energy-to-interference-plus-noise ratio.

Figure 9:
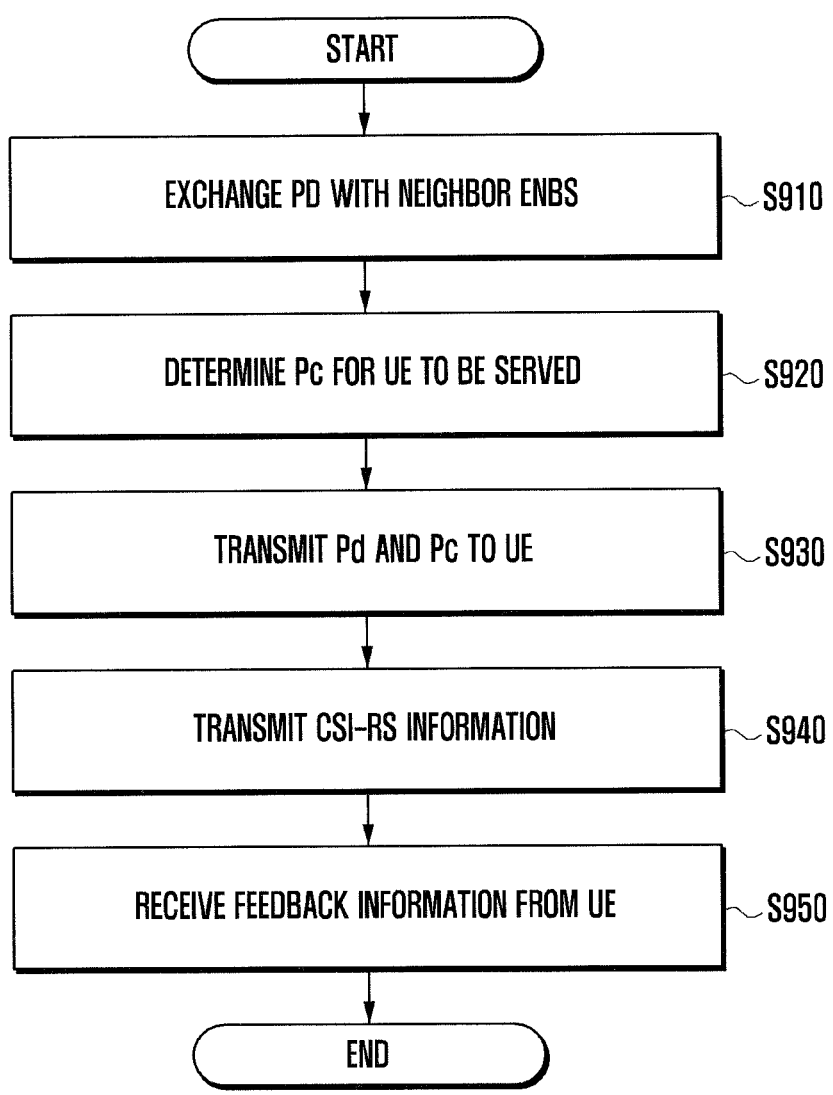
FIG. 9 is a flowchart illustrating an evolved Node B (eNB) procedure of the interference measurement method according to an exemplary embodiment of the present invention.

FIG. 9 is a flowchart illustrating the eNB procedure of the interference measurement method according to an exemplary embodiment of the present invention.

The eNB exchanges the interference measurement information, i.e. Pd, with the neighbor eNBs at step S910. The exchange of Pd can be performed through wired or wires interface.

The eNB determines Pc for the UE to be served at step 920. The eNB transmits Pc and Pd to the UE at step 930. As described above, Pd can be prepared per CSI-RS for interference measurement or as a common value for all CSI-RSs received for interference measurement.

The eNB sends the UE the CSI-RS information at step S940. The CSI-RS information may include CSI-RS configuration for channel measurement and CSI-RS configuration for interference measurement. The eNB sends the UE the respective CSI-RSs according to the CSI-RS information.

The eNB receives feedback information from the UE and schedules the UE based on the feedback information at step S950.

Figure 10:
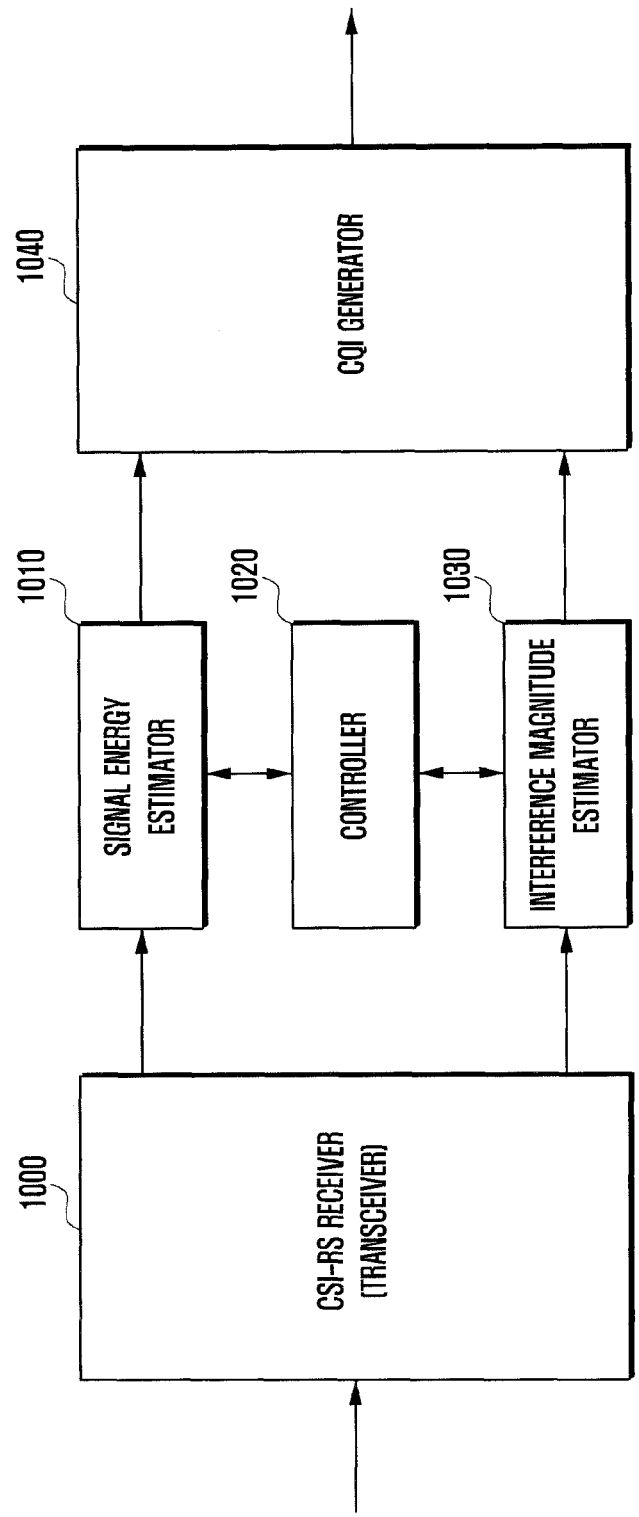
FIG. 10 is a block diagram illustrating a configuration of a UE according to an exemplary embodiment of the present invention.

FIG. 10 is a block diagram illustrating a configuration of a UE according to an exemplary embodiment of the present invention.

The UE receives the CSI-RS from the eNB by means of a CSI-RS receiver 1000 and supplies the CSI-RS for channel state measurement to a signal energy estimator 1010 for use in acquiring Es value by applying Pc and supplies the CSI-RS for interference measurement to the interference magnitude estimator 1030 for use in acquiring interference magnitude by applying Pd, under the control of the controller 1020. The measured Es and interference magnitude are input to the CQI generator 1040 to generate CQI value. The CQI generator 1040 may also receive the input of the interference and noise measured on IMRs corresponding to No of Equation (3).

Figure 11:
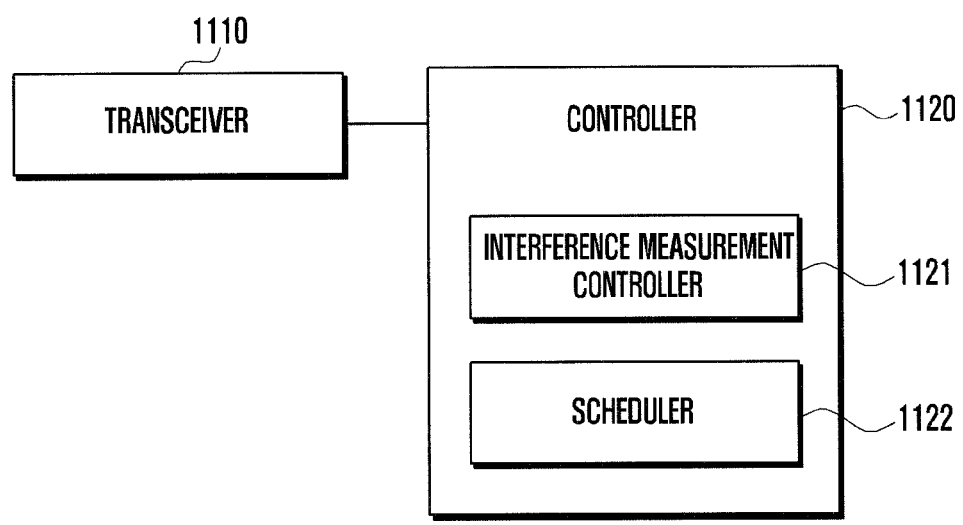
FIG. 11 is a block diagram illustrating a configuration of an eNB according to an exemplary embodiment of the present invention.

FIG. 11 is a block diagram illustrating a configuration of an eNB according to an exemplary embodiment of the present invention.

The transceiver 1110 transmits and receives signals (information) to and from a UE. The information may include CSI-RS for channel and/or interference measurement, CSI-RS configuration information, control information, data, and the like.

The controller 1120 controls overall operations of the eNB, including transmitting CSI-RS information for the UE's channel and interference measurement and scheduling the UE based on the feedback information transmitted by the UE. For this purpose, the controller 1120 may further include an interference measurement controller 1121 and a scheduler 1122.

The interference measurement controller 1121 controls to transmit the channel measurement information and the interference measurement information to the UE. The channel measurement information is the transmit power ratio between the CSI-RS and data channel transmitted through a certain antenna which is designated for transmitting data to the UE, and the interference measurement information is the transmit power ratio between the CSI-RS and data channel transmitted through a certain antenna causing interference to the UE.

The interference measurement controller 1121 controls exchanging the interference information with neighbor eNBs.

The scheduler 1122 is capable of scheduling the UE based on the feedback information transmitted by the UE.

Although it is depicted that the function blocks are responsible for distinct functions in FIGS. 10 and 11, exemplary embodiments of the present invention are not limited to such a configuration. For example, the function of the interference measurement controller 1121 of FIG. 11 can be performed by the controller 1120.

As described above, the interference measurement method and apparatus according to exemplary embodiments of the present invention is advantageous in that the UE measures and reports interference to the eNB effectively and thus the eNB performs scheduling data transmission efficiently.

While the invention has been shown and described with reference to certain exemplary embodiments thereof, it will be understood by those skilled in the art that various changes in forms and details may be made therein without departing from the spirit and scope of the invention as defined by the appended claims and their equivalents.

What is claimed is:

1. An interference measurement method of a terminal in a wireless communication system, the method comprising:
   receiving channel measurement information and interference measurement information from a base station;
   receiving a channel state information reference signal (CSI-RS);
   determining a received signal energy based on the channel measurement information and the CSI-RS;
   determining an interference based on the interference measurement information;
   generating channel quality information based on the received signal energy and the interference; and
   transmitting the channel quality information to the base station,
   wherein the interference measurement information comprises a transmit power ratio between a CSI-RS and data channel incurring interference to the terminal, and wherein the channel measurement information and the interference measurement information are independently configured for at least two transmission points, respectively.

2. The method of claim 1, wherein the channel measurement information comprises a transmit power ratio between the channel state information reference signal and data channel for use in data transmission to the terminal.

3. The method of claim 1, wherein the interference measurement information is set per channel state information reference signal for interference measurement.

4. The method of claim 1, wherein the interference measurement information is set commonly for all channel state information reference signals for interference measurement.

5. The method of claim 1, wherein the generating of the channel quality information comprises determining the channel quality information by reflecting interference and noise with the exception of the interference measured based on the channel state information reference signal.

6. A terminal for measuring interference in a wireless communication system, the terminal comprising:
- a transceiver configured to communicate with a base station; and
- a controller configured to:
  - control reception of channel measurement information and interference measurement information from a base station,
  - receive a channel state information reference signal (CSI-RS),
  - determine a received signal energy based on the channel measurement information and the CSI-RS,
  - determine an interference based on the interference measurement information,
  - generate channel quality information based on the received signal energy and the interference, and
  - transmit the channel quality information to the base station,
- wherein the interference measurement information comprises a transmit power ratio between a CSI-RS and data channel incurring interference to the terminal, and
- wherein the channel measurement information and the interference measurement information are independently configured for at least two transmission points, respectively.

7. The terminal of claim 6, wherein the channel measurement information comprises a transmit power ratio between the channel state information reference signal and data channel for used in data transmission to the terminal.

8. The terminal of claim 6, wherein the interference measurement information is set per channel state information reference signal for interference measurement.

9. The terminal of claim 6, wherein the interference measurement information is set commonly for all channel state information reference signals for interference measurement.

10. The terminal of claim 6, wherein the controller generates the channel quality information by reflecting interference and noise with the exception of the interference measured based on the channel state information reference signal.

11. A method for a base station to control interference measurement of a terminal in a wireless communication system, the method comprising:
- transmitting channel measurement information and interference measurement information to the terminal;
- transmitting a channel state information reference signal (CSI-RS) to the terminal; and
- receiving channel quality information from the terminal,
- wherein the channel quality information is generated based on received signal energy determined based on the channel measurement information and the CSI-RS,
- wherein the interference information is determined based on the interference measurement information,
- wherein the interference measurement information comprises a transmit power ratio between a CSI-RS and data channel incurring interference to the terminal, and
- wherein the channel measurement information and the interference measurement information are independently configured for at least two transmission points, respectively.

12. The method of claim 11, wherein the channel measurement information comprises a transmit power ratio between the channel state information reference signal and data channel for used in data transmission to the terminal.

13. The method of claim 11, further comprising exchanging the interference measurement information with neighbor base stations.

14. The method of claim 11, wherein the interference measurement information is set per channel state information reference signal for interference measurement.

15. The method of claim 11, wherein the interference measurement information is set commonly for all channel state information reference signals for interference measurement.

16. A base station for controlling interference measurement of a terminal in a wireless communication system, wherein the base station comprises:
- a transceiver configured to communicate with the terminal; and
- a controller configured to:
  - control transmission of channel measurement information and interference measurement information to the terminal,
  - transmit a channel state information reference signal (CSI-RS) to the terminal, and
  - receive channel quality information from the terminal,
- wherein the channel quality information is generated based on received signal energy determined based on the channel measurement information and the CSI-RS,
- wherein the interference information is determined based on the interference measurement information,
- wherein the interference measurement information comprises a transmit power ratio between a CSI-RS and data channel incurring interference to the terminal, and
- wherein the channel measurement information and the interference measurement information are independently configured for at least two transmission points, respectively.

17. The base station of claim 16, wherein the channel measurement information comprises a transmit power ratio between the channel state information reference signal and data channel for used in data transmission to the terminal.

18. The base station of claim 16, wherein the controller controls exchanging the interference measurement information with neighbor base stations.

19. The base station of claim 16, wherein the interference measurement information is set per channel state information reference signal for interference measurement.

20. The base station of claim 16, wherein the interference measurement information is set commonly for all channel state information reference signals for interference measurement.

* * * * *